J. F. ROGERS.
CULTIVATOR.
APPLICATION FILED APR. 2, 1913.
1,149,785.
Patented Aug. 10, 1915.
2 SHEETS—SHEET 2.
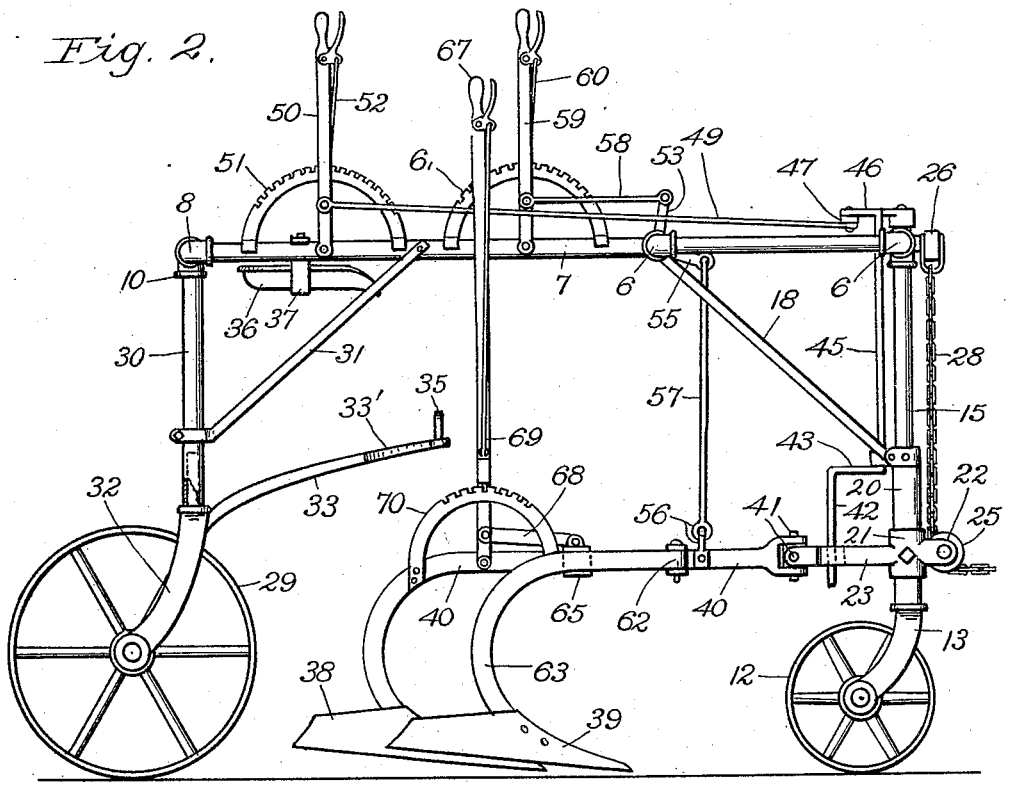
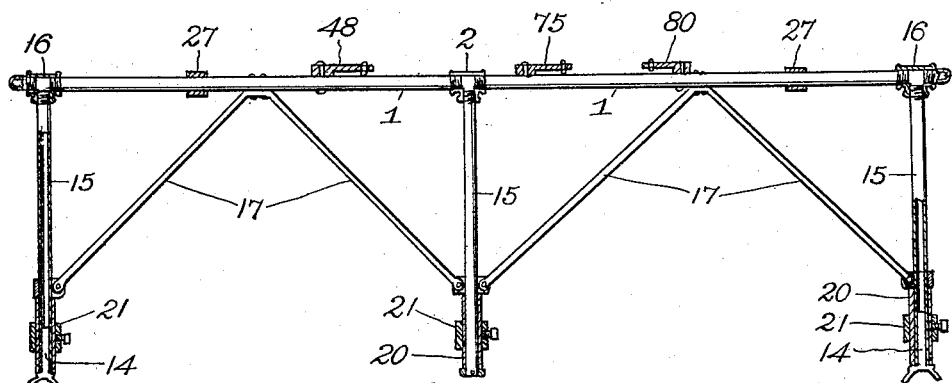
WITNESSES:
R. L. Hamilton
K. Imboden
INVENTOR:
Judson F. Rogers
BY
F. G. Fischer,
ATTORNEY.

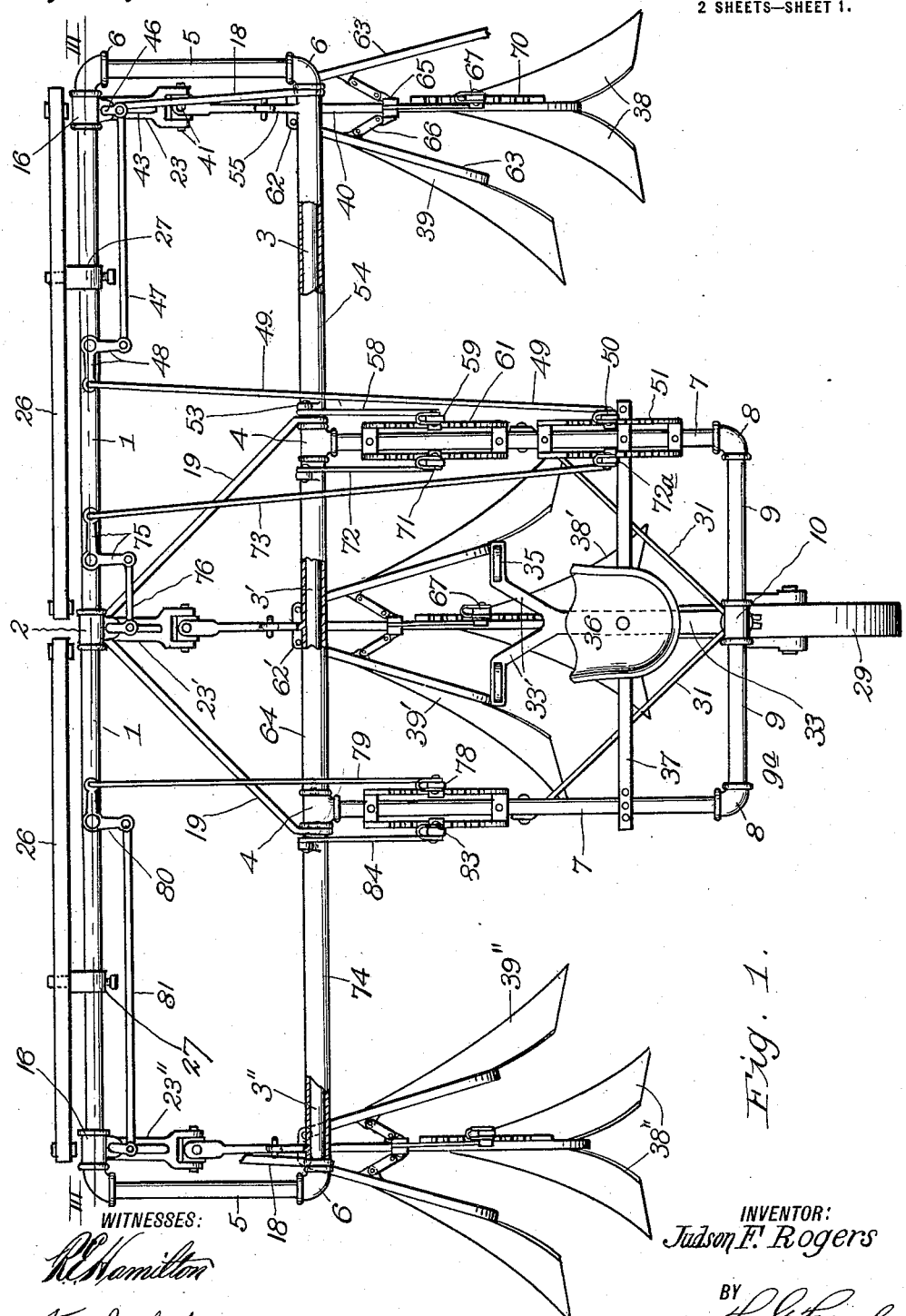

UNITED STATES PATENT OFFICE.

JUDSON F. ROGERS, OF KANSAS CITY, MISSOURI.

CULTIVATOR.

1,149,785.  Specification of Letters Patent.  Patented Aug. 10, 1915.

Application filed April 2, 1913. Serial No. 758,345.

*To all whom it may concern:*

Be it known that I, JUDSON F. ROGERS, a citizen of the United States, residing at Kansas City, in the county of Jackson and State of Missouri, have invented certain new and useful Improvements in Cultivators, of which the following is a specification.

This invention relates to cultivators.

The object of the invention is to provide a cultivator that shall be especially well adapted for "dry" farming, which has for its essential object the conservation of rainwater in the soil. As rain is infrequent in such regions, it becomes a matter of great importance to planters to retain as much of the rainfall as possible in the soil.

Ordinary cultivators do not break the ridges that are formed by the plow. Consequently, when rain falls, a large portion of the water flows from the ridges into the furrows which thus receive the water faster than they can absorb it, the result being that a large portion of the water flows away and is wasted.

My herein described implement will more effectually conserve the water, by means of the formation of secondary furrows in the high parts of the ridges.

Other features of my improved cultivator are, an improved frame structure, characterized by lightness, strength and low cost; and means whereby the outer plows of each group are laterally adjustable by the operator while the implement is in motion, thereby plowing at various distances from the rows according to circumstances.

In order that the invention may be fully understood, reference will now be made to the accompanying drawings, in which:

Figure 1 is a plan view of a three-row cultivator embodying the invention, the draft chains and one shovel being omitted. Fig. 2 is a side elevation, showing one of the draft chains. Fig. 3 is a vertical sectional view of the fore part of the frame, taken on a line III—III of Fig. 1.

The fore part of the frame is rectangular in outline and horizontally disposed, with its larger dimensions transverse. Preferably, it is constructed of pipe, though angle or channel iron may be employed. The front bar 1 is made in two equal sections 1—1 connected by a T union 2. The rear bar 3—3'—3'' is made in three separate sections, 3, 3' and 3'' which are connected by T unions 4. The ends of the front and rear bars 1—3—3'' are rigidly connected by side bars 5 and elbows 6.

The rear part of the frame is comparatively narrow, and comprises the side bars 7, connected to T's 4, and extending horizontally rearward, their ends being connected by elbows 8 to the two halves 9—9 of a rear crossbar 9ª. Members 9 are united by a T 10.

The fore part of the frame is supported by three caster wheels 12, one of which is clearly shown on Fig. 2. The caster forks 13 are provided with shanks 14 which are rotatably mounted in vertical cylindrical posts 15. Said posts are connected to the bar 1 by means of T's 2 and 16, and are braced laterally by braces 17, also rearwardly by braces 18 which connect with rear members 3, 3''. Additional bracing of the frame is provided by rearwardly diverging braces 19, connecting said front and rear members 1—3—3''. Fixedly mounted upon the lower end portion of each post 15 is a sleeve 20. Fixedly mounted upon each sleeve 20 is a collar 21, provided with a pulley jaw 22 and a rearwardly extending arm 23. Each jaw 22 carries a pulley 25.

On each side of the front frame, an equalizer-bar 26 is pivotally mounted on a collar 27 fixedly mounted on bar 1. Said equalizer-bars are movable in a vertical plane.

To each end of each equalizer-bar is attached a draft-chain 28 which passes down under its pulley 25, thence forward to a swingletree. Three swingletrees are employed, the intermediate one being connected to the central chains 28. (Not shown.)

By the construction described, the pulleys 25 being located as low as practicable, the draft upon the implement will not tend to uptilt the rear parts thereof.

The rear part of the frame is supported by a caster-wheel 29 and a centrally located standard 30 which latter is connected to the T 10, and is braced by two forwardly and upwardly extending braces 31.

The caster fork 32 is provided with a forwardly extending steering bar 33, having lateral branches 33' provided with stirrups 35. The seat 36 is mounted on a transverse bar 37, in turn mounted on frame-bars 7.

Each cultivator set comprises three plows, of which the middle plow 38 travels behind the other two 39. The middle plow beam, 40 extends horizontally forward and terminates in a universal joint 41 by which it is connected with the adjacent plow steering arm 23.

The right-hand plow-steering arm 23 is provided with a slot (not shown) into which passes a vertical pin 42 carried by a rock-arm 43 mounted on a vertical rock-shaft 45 on the upper end of which is a rock-arm 46. The rock-arm 46 is operated by means of a rod 47, a bell-crank 48, a reach-rod 49 and a hand lever 50, which latter is mounted on the right-hand frame bar 7. A notched sector 51 receives a latch 52 on said lever. By turning said lever, it is obvious that the right-hand steering-arm 23 will be turned to the right or left, as desired, thereby changing the angle of the connected plow beam 40.

For motion transmission, three tubular rock-shafts 54, 64, 74 are mounted respectively upon the frame sections 3, 3' and 3''. The right-hand rock-shaft 54 is provided with two arms 53, 55, extending in different directions, arm 55 being directly over the plow-beam 40 and arm 53 being at the opposite end of the shaft. Plow-beam 40 is connected by eyes 56 to a depending rod 57 which is connected to rock-arm 55. The companion rock-arm 53 is connected by a reach-rod 58 to a hand lever 59, fulcrumed on frame bar 7 in front of the aforesaid lever 50. Lever 59 is provided with a latch 60 and a notched sector 61. By turning this lever, it will be understood that the plow-beam 40 may be raised or lowered, thus determining the depth of cultivation. Said plow-beam is provided with a pair of laterally projecting lugs 62, on which the front ends of the companion plow-beams 63 are pivoted for movement toward and from the central beam. Beams 63 are diverged rearwardly, and their plows 39 are arranged to turn the soil outwardly. Slidably mounted on the center beam 40 is a block 65, which is connected to both side beams 63 by toggle links 66. An upwardly extending lever 67 is fulcrumed on beam 40 and is connected to block 65 by a link 68. Lever 67 has a latch 69 and a notched sector 70. It is obvious that by shifting said lever the angles at which the side beams 63 extend may be altered, thus determining the degree of approach of the plows 39 to the plants.

Each of the three plow sets is provided with steering and lowering means that are the same in construction as those already described. The lever 71, seen on Fig. 1 at the left of lever 59, operates through rod 72 to rock the rock-shaft 64, thereby controlling the height of the middle set of plows, by means duplicating that above described. The lever 72$^a$, seen at the left of lever 50, operates through reach-rod 73, bell-crank 75 and rod 76 to direct the steering-arm 23' of the intermediate plow set, 38'—39'. Lever 78, at the operator's left, operates through a reach-rod 79, bell-crank 80 and rod 81, to direct the steering-arm 23'' of the left-hand plow set. Lever 83, at the left of lever 78, operates through a rod 84 to turn the rock-shaft 74 and control the height of the left-hand set of plows.

When this cultivator is in use, it is so guided that the lateral plows 39—39'—39'' straddle the ridges; hence the intermediate plows 38—38'—38'' will cut furrows in the center of each of the ridges. The advantage gained by this operation has been hereinbefore pointed out. Whenever the plows require a change of lateral position, such change is effected by operation of the stirrups 35 and of the hand-levers 50 and 78. The means for independent adjustments of the outer plows 38—38'—38'' have also been described, and the mode of using the cultivator will be understood by any person skilled in the art.

While I have shown the machine arranged as a three row cultivator, it is obvious the cultivator gangs can be increased or diminished in number as desired.

Having thus described my invention, what I claim and desire to secure by Letters Patent is:

A cultivator comprising a front and rear frame, the rear bar of the rear frame consisting of a pair of sections and an intermediate section, T's for rigidly connecting the adjacent ends of the sections, the outer ends of the end sections being rigidly connected to the rear ends of the side bars of the front frame, tubular rock shafts incasing the respective sections, means for rocking the shafts independent of each other, said rear frame having the forward ends of its side bars coupled to the T's, and depending members for supporting both frames normally spaced in the same plane.

In testimony whereof I affix my signature, in the presence of two witnesses.

JUDSON F. ROGERS.

Witnesses:
F. G. FISCHER,
L. J. FISCHER.